(12) United States Patent
Grobelny et al.

(10) Patent No.: US 10,671,149 B2
(45) Date of Patent: Jun. 2, 2020

(54) SYSTEM AND METHODS FOR REMOTELY APPLYING BATTERY MANAGEMENT POLICIES BASED ON LOCAL USER BEHAVIOR

(71) Applicant: Dell Products, L.P., Round Rock, TX (US)

(72) Inventors: Nicholas D. Grobelny, Austin, TX (US); Jacob Mink, Austin, TX (US); Rick C. Thompson, Cedar Park, TX (US); Nikhil Manohar Vichare, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 223 days.

(21) Appl. No.: 15/852,661

(22) Filed: Dec. 22, 2017

(65) Prior Publication Data

US 2019/0196575 A1    Jun. 27, 2019

(51) Int. Cl.

| G06F 1/00 | (2006.01) |
|---|---|
| G06F 1/3296 | (2019.01) |
| G06F 1/26 | (2006.01) |
| H02J 7/04 | (2006.01) |
| H02J 7/00 | (2006.01) |
| G06F 1/28 | (2006.01) |
| G06F 1/3206 | (2019.01) |

(52) U.S. Cl.
CPC ............ *G06F 1/3296* (2013.01); *G06F 1/263* (2013.01); *G06F 1/28* (2013.01); *G06F 1/3206* (2013.01); *H02J 7/0013* (2013.01); *H02J 7/007192* (2020.01); *H02J 7/045* (2013.01)

(58) Field of Classification Search
CPC ........ G06F 1/3296; G06F 1/263; H02J 7/047; H02J 7/045; H02J 7/0013
See application file for complete search history.

(56) References Cited

U.S. PATENT DOCUMENTS

| 8,479,024 B2 | 7/2013 | Vichare et al. |
| 9,197,092 B2 | 11/2015 | Verdun et al. |
| 9,263,912 B2 | 2/2016 | Verdun et al. |
| 2016/0064961 A1* | 3/2016 | DiCarlo ................. H02J 7/007 320/157 |
| 2016/0126762 A1 | 5/2016 | Verdun et al. |
| 2016/0261122 A1* | 9/2016 | Childress .............. H02J 7/0057 |

* cited by examiner

*Primary Examiner* — Xuxing Chen
(74) *Attorney, Agent, or Firm* — Fogarty LLP

(57) ABSTRACT

Systems and methods for remotely applying battery management policies based on local user behavior. In an illustrative, non-limiting embodiment, an Information Handling System (IHS) may include: a processor and a memory coupled to the processor, the memory having program instructions stored thereon that, upon execution, cause the IHS to: receive a battery management policy from a remote server; and apply the battery management policy to the IHS, wherein the battery management policy is selected based upon a local user's behavior.

16 Claims, 7 Drawing Sheets

SYSTEM AND METHODS FOR REMOTELY APPLYING BATTERY MANAGEMENT POLICIES BASED ON LOCAL USER BEHAVIOR

FIELD

The present disclosure generally relates to Information Handling Systems (IHSs), and, more particularly, to systems and methods for remotely applying battery management policies based on local user behavior.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SUMMARY

Embodiments of systems and methods for remotely applying battery management policies based on local user behavior. In an illustrative, non-limiting embodiment, an Information Handling System (IHS) may include: a processor and a memory coupled to the processor, the memory having program instructions stored thereon that, upon execution, cause the IHS to: receive a battery management policy from a remote server; and apply the battery management policy to the IHS, wherein the battery management policy is selected based upon a local user's behavior.

The battery management policy may be selected based upon telemetry obtained by the IHS during operation of the IHS by the local user. The battery management policy may establish a mode of operation for a battery coupled to the IHS, the mode of operation selected from the group consisting of: standard, express, primarily AC, adaptive, and custom.

In some implementations, the IHS may determine that the local user's behavior has changed, receive an updated battery management policy from the remote server, and apply the updated battery management policy to the IHS, where the battery management policy is selected based upon the changed behavior.

The battery management policy may establish a maximum charging voltage or current for a battery coupled to the IHS. In some cases, the maximum charging voltage or current is selected based upon a behavior of another one or more users of another one or more instances of the IHS having another one or more batteries. Moreover, the battery and the other battery have different electrical specifications.

In other implementations, the IHS may determine that other user's behavior has changed; receive an updated battery management policy from the remote server; and apply the updated battery management policy to the IHS, where the battery management policy is selected based upon the changed behavior of the other user.

The maximum charging voltage or current may have a first value in response to the local user showing a more aggressive behavior than the other user, the maximum charging voltage or current may have a second value in response to the local user showing a less aggressive behavior than the other user, and the first value may be smaller than the second value. The battery management policy may be autonomously applied by the IHS independently of any connection between the IHS and the remote server.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for remotely applying battery management policies based on local user behavior. In various implementations, These systems and methods may provide wear protection to prolong battery life by reducing charge/discharge stress, while still allowing users to take advantage of the full battery capacity. Cloud policy push techniques may allow battery management algorithms to be updated remotely. Moreover, local techniques may enable use of telemetry in real-time to switch between battery modes, to make adjustments to a glide path, etc.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
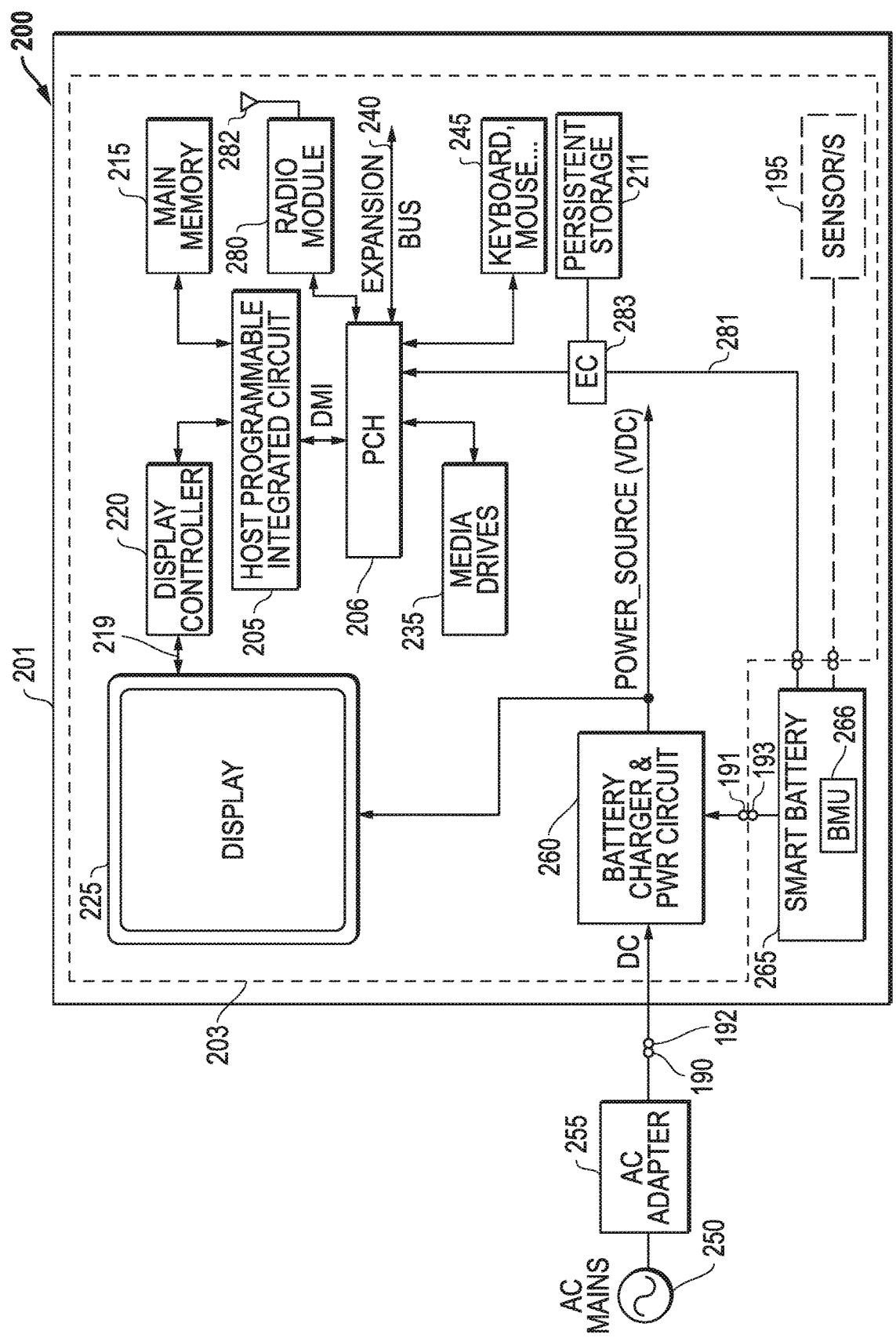
FIG. 1 illustrates an example of an Information Handling System (IHS) implementation according to some embodiments.

FIG. 1 is a block diagram of an information handling system or "IHS" 200 (e.g., mobile portable information handling system such as notebook computer, MP3 player, personal data assistant (PDA), cell phone, smart phone, cordless phone, tablet computer, "2-in-1" or convertible computer, etc.), as it may be configured with various components within an outer chassis enclosure 201 (e.g., tablet computer body or smartphone body, hinged notebook computer base and/or lid, etc.).

In this example, IHS 200 includes a host processing device or host programmable integrated circuit 205 (e.g., CPU such as an Intel Pentium series processor, an Advanced Micro Devices (AMD) processor or one of many other processors currently available), which may be optionally coupled together with a platform controller hub (PCH) 206. Other examples of programmable integrated circuits 205 include any other suitable one or more programmable integrated circuits such as controller, microcontroller, microprocessor, ASIC, programmable logic device "PLD" such as FPGA, complex programmable logic device "CPLD", etc.

In the illustrated embodiment, host programmable integrated circuit 205 may be configured to execute an operating system (OS) such as Windows-based operating system, Linux-based operating system, etc. System memory 215 (e.g., DRAM) and display controller 220 may be coupled as shown to host programmable integrated circuit 205, and display device 225 (e.g., a video monitor) may be coupled to display controller 220 to provide visual images (e.g., via graphical user interface) to the user, for example, via eDP components 219 such as an eDP cable and eDP connector. Media drives 235 may be coupled to host programmable integrated circuit 205 via PCH 206 to provide permanent or non-volatile storage for the information handling system.

Still referring to FIG. 1, expansion bus 240 may be coupled to PCH 206 to provide IHS 200 with additional plug-in functionality. For example, expansion bus 240 may be a PCI bus, PCI Express bus, SATA bus, USB or virtually any other expansion bus. Input devices 245 (e.g., such as a keyboard, touchpad, mouse) may be coupled via PCH 206 to host programmable integrated circuit 205 to enable the user to interact with IHS 200. In other mobile applications, such as convertible computer, tablet computers and smart phones, a touchscreen may additionally or alternatively be provided for both presenting a graphical user interface (GUI) and for accepting user input. Radio module 280 may be coupled to host programmable integrated circuit 205 via PCH 206, with at least one antenna element 282 coupled to radio module 280 for wireless reception and transmission (e.g. to enable wireless LAN and/or cellular data communications).

Embedded controller (EC) 280 may also be coupled to PCH 206 as shown, and may be configured to perform various tasks such as battery and power management, I/O control, etc. Persistent storage 211 (e.g., embedded and partitioned flash memory, Electrically Erasable Programmable Read Only Memory or "EEPROM," etc.) may be coupled to EC 280 for storing persistent information for EC 280.

In the particular embodiment of FIG. 1, IHS 200 is coupled to an external source of power, namely AC mains 250 through AC adapter 255. It will be understood that external power may be alternatively provided from any other suitable external source (e.g., external DC power source), or that AC adapter 255 may alternatively be integrated within an IHS 200 such that AC mains 250 supplies AC power directly to IHS 200.

AC adapter 255 is removably coupled to, and separable from, battery charge controller 260 of IHS 200 at mating interconnection terminals 190 and 192 in order to provide IHS 200 with a source of DC power to supplement DC power provided by battery cells of a battery system in the form of smart battery pack 265—e.g., a lithium ion (Li-ion) or nickel metal hydride (NiMH) battery pack including one or more rechargeable batteries—and a battery management unit (BMU) 266 that includes, for example, an analog front end (AFE), storage (e.g., non-volatile memory) and microcontroller. Additionally or alternatively, charge controller 260 may be controlled by the EC using an SMBus connection or the like. Battery charge controller 260 of IHS 200 may also provide DC power for recharging battery cells of battery system 265 during charging operations.

As further shown in FIG. 1, battery system data bus (SMBus) 281 may be coupled to smart battery pack 265 by interconnection terminals to provide real-time and/or stored information from BMU 266 of smart battery pack 265 to EC 280 and to other components such as programmable integrated circuit 205. In some cases, SMBus 281 may be replaced by $I^2C$ or other suitable serial communication interface.

Examples of such real-time and/or stored information may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or host system operating conditions such as processor operating speed data, system power management and cooling system settings, state of "system present" pin signal, environmental information (e.g., such as ambient temperature, relative humidity, system geolocation measured by GPS or triangulation, time and date, etc.), and event occurrences (e.g., acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.).

In one embodiment, loss of "system present" pin signal from paired IHS 200 indicates the battery was removed (or unpaired) from the main portion 203 of IHS 200 and/or other system manipulation has occurred. As shown, BMU 266 may be coupled to one or more sensors 195.

When battery system 265 of IHS 200 is optionally provided as a replaceable smart battery pack, it may be configured for insertion (paring with main portion 203) and removal (un-pairing with main portion 203) from a corresponding battery pack compartment within chassis 201 of IHS 200 (e.g., such as plastic and/or metal enclosure of a notebook computer, tablet computer, convertible computer smart phone, etc.), and may be provided with external power and data connector terminals 193 for contacting and making temporary interconnections with mating power connector terminals and data connector terminals 191 provided within the battery pack compartment to provide power to the system load (i.e., power-consuming components) of a main portion 203 of IHS 200, as well as to exchange data and system present signal with one or more processing devices of IHS 200.

Alternatively, a smart battery pack may be a non-replaceable or permanent battery pack that is enclosed (or captured) within an IHS chassis (such as a tablet computer or smart phone). In an embodiment, external power and data connector terminals 193 of such a captured battery pack may be soldered to mating power connector terminals and data connector terminals 191 provided within the battery pack compartment.

In various embodiments, IHS 200 may include additional, fewer and/or alternative components suitable for a given application including other programmable integrated circuits such as discrete graphics processing units (GPUs), etc.

Figure 2:
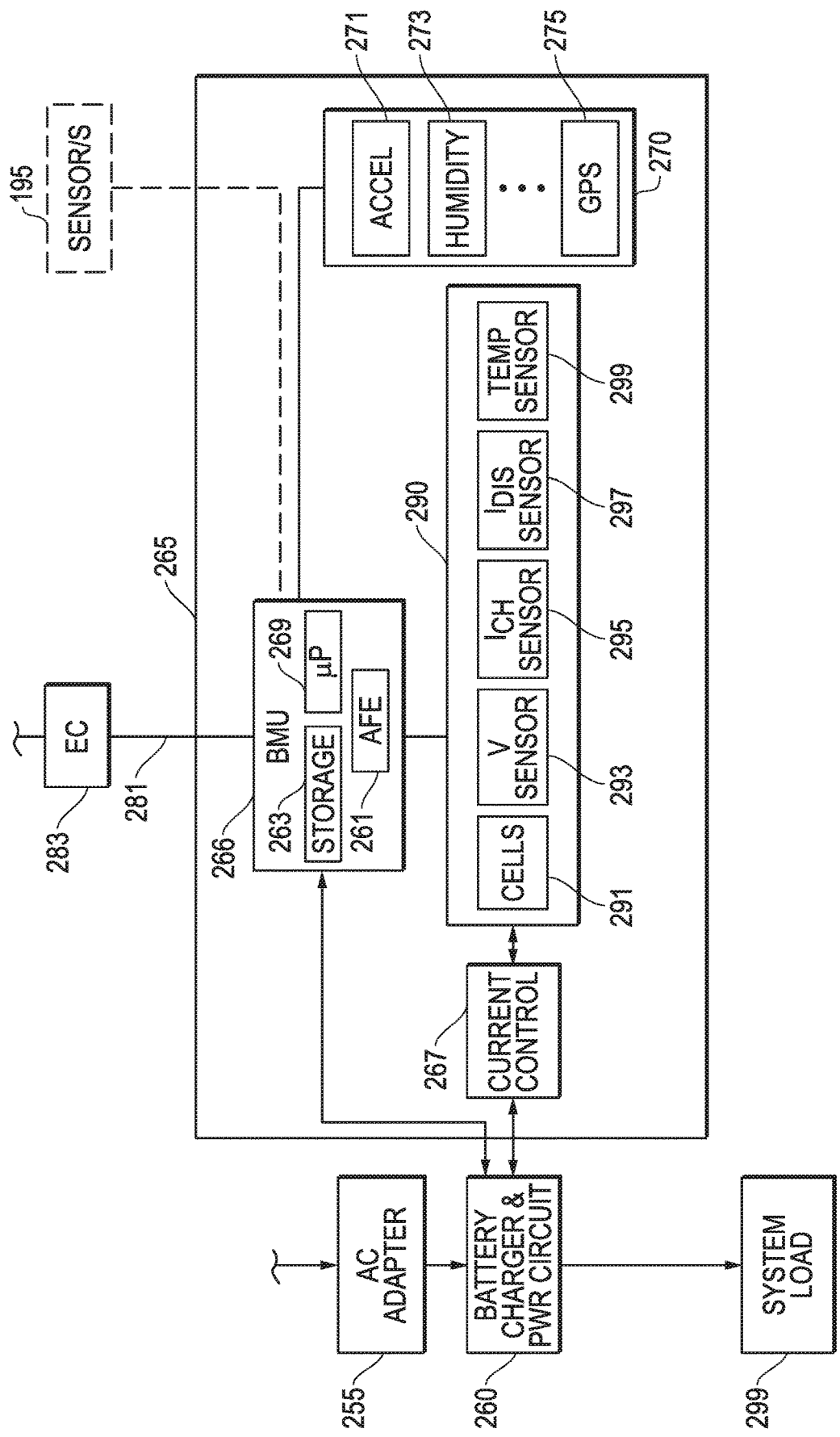
FIG. 2 illustrates an example of a battery system according to some embodiments.

FIG. 2 illustrates an example of battery system 265 in the form of a smart battery pack as it may be coupled to receive DC power from battery charge controller 260 during charging, and coupled to provide DC power to system load 299 (i.e., power-consuming components) of IHS 200 during battery operation. In this instance, battery system 265 may include a battery unit 290 that includes one or more rechargeable battery cells 291 as well as one or more sensors, such as temperature sensor 299, voltage sensor 293, charging current sensor 295, and a discharge current sensor 292, etc.

When at least partially charged, battery cells 291 may be configured to not only power other components of IHS 200 (i.e., when battery power/data terminals 193 are electrically connected to system power/data terminals 191), but also to power components of BMU 266 even when the remainder of the power-consuming components of IHS 200 are powered OFF and when battery pack power/data terminals 193 are not electrically connected to system power/data terminals 191.

In the embodiment of FIG. 2, battery system 265 is provided with battery current control circuitry 267 to control flow of charge current to battery cells 291 of battery pack 265, and to also control flow of discharge current from battery cells 291 of battery pack 265. In an embodiment, battery current control circuitry 267 may include charge and discharge circuitry in the form of two field effect transistors (FETs) coupled in series between battery cells 291 and battery charge controller 260 (and optional battery terminal 193). The FETs of battery current control circuitry 267 may include a charge FET switching element that forms a part of a charge circuit that is controlled by components (e.g., programmable integrated circuit 269 and/or AFE 261) of BMU 266 to allow or disallow charge current to the battery cells 291, and a discharge FET switching element that forms a part of discharge circuit that is controlled by components (e.g., programmable integrated circuit 269 and/or AFE 261) of BMU 266 to allow or disallow discharge current from the battery cells 324.

In the illustrated embodiment, temperature sensor 299, voltage sensor 293, charging current sensor 295, and discharge current sensor 292 are used to respectively provide to BMU 266 the temperature of the battery, the voltage in the battery, and the current going through the battery during charging and discharging. Temperature sensor 299 may detect both high and low temperature conditions that may affect the battery life.

When AC adapter 255 is connected to AC mains 250, battery charger 260 charges battery cells 291 of rechargeable smart battery pack 265 as directed by programmable integrated circuit 269 (e.g., microcontroller or microprocessor) of BMU 266. Additionally or alternatively, the charge rate may be controlled by the EC over an SMBus or the like. Although battery unit 290 includes cells 291 and sensors 293, 295, 297, and 299, it will be understood that cells 291 and sensors may be alternatively provisioned outside of a battery unit and coupled to BMU 266 in any other suitable manner internal or external to battery system 265.

As further shown in FIG. 2, battery system 265 may include one or more other sensors 270: integrated circuits such as accelerometer 271, humidity sensor 273, global positioning system (GPS) sensor/receiver 275, or barometric altimeter sensor or airborne particulate sensors, such as aerosol impactor or laser particle counter (not shown), etc. However, it will be understood that any one of other sensors 270 may be alternatively provisioned as sensors 195 coupled by interconnection terminals to BMU 266 but positioned outside of, or external to, battery system 265.

For example, one or more sensors 195 may be provided at any location outside of battery system 265 and within chassis enclosure 201 of IHS 200 that is suitable for sensing a given environmental parameter, such as air temperature within chassis enclosure 201, ambient air temperature external to chassis enclosure 201, relative humidity within chassis enclosure 201, ambient relative humidity external to chassis enclosure 201, airborne particulates within chassis enclosure 201, airborne particulates external to chassis enclosure 201, etc.

Still referring to FIG. 2, BMU 266 may include battery system storage 263 (e.g., storage device such as non-volatile random access memory "NVRAM," volatile or dynamic random access memory "DRAM," any other form of suitable non-volatile and/or volatile memory, etc.), as well as analog front end (AFE) 261 that are coupled to programmable integrated circuit 269. AFE 261 may be present, for example, to receive and/or condition any non-digital sensor inputs. In an embodiment, programmable integrated circuit 269 of BMU 266 may perform measurement of current and voltage, as well as calculation of current capacity of the battery and other battery-related calculations and battery charging/discharging control BMU programmable integrated circuit 269 may also perform measurement of environmental, system operating conditions, and/or event information using sensors of battery unit 290 and other sensors 270 and/or 195 that may be present, as well as recording or storing this measured data in storage 263 of BMU 266. However, it will be understood in other embodiments, one or more other programmable integrated circuits may additionally or alternatively perform measurement of environmental, system operating conditions, and/or event information, as well as recording this information in storage 263 and/or other storage components of system 200.

Figure 3:
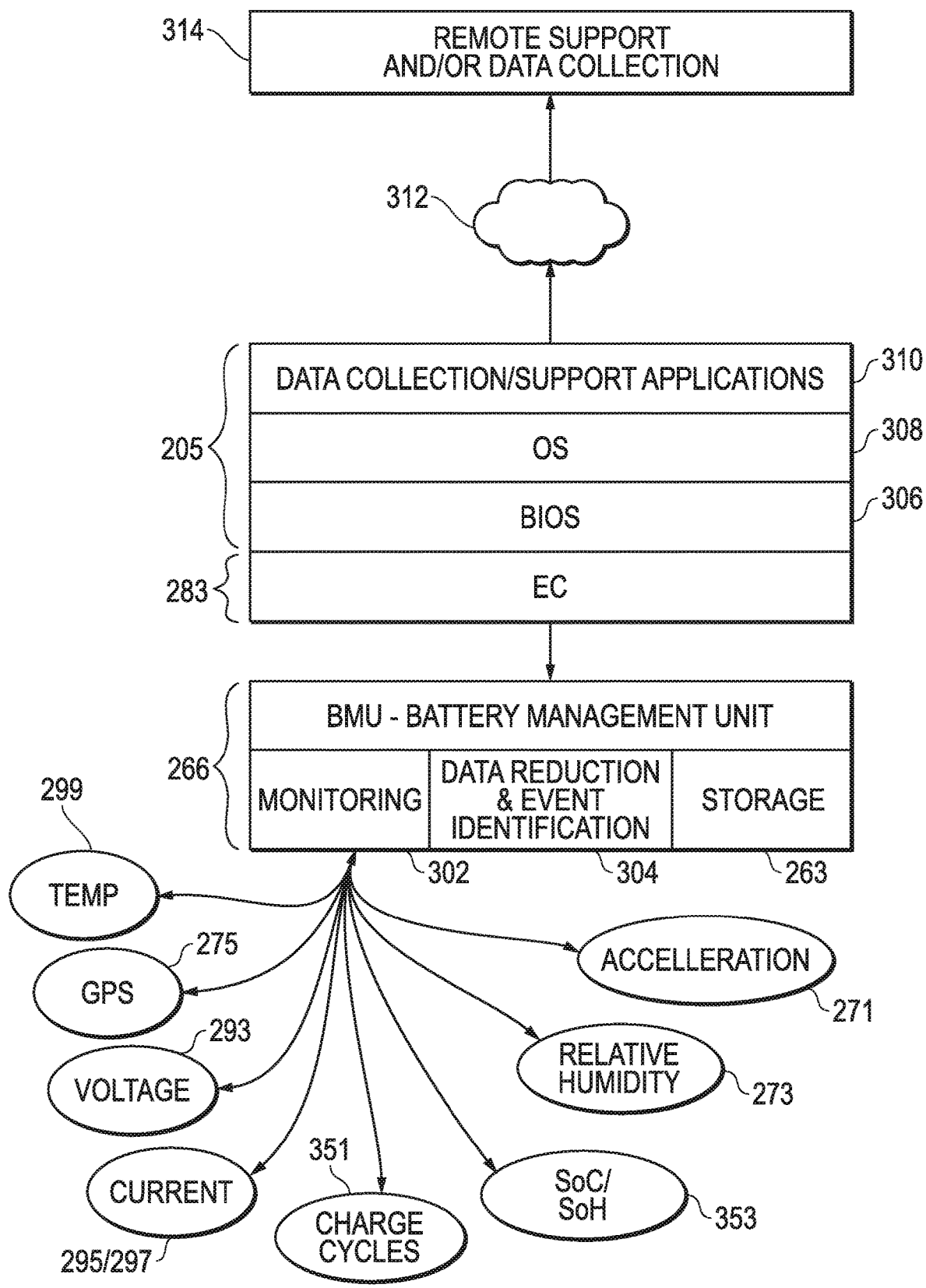
FIG. 3 illustrates examples of relationships among logic and hardware layers of IHS 200 according to some embodiments.

FIG. 3 is a block diagram showing examples of relationships "layers" of IHS 200, according to some embodiments. As described below, integrated circuit 269 of BMU 266 may be coupled to perform sensor monitoring tasks 302 that include monitoring sensor inputs and/or data or information provided by various sensors such as described in relation to FIG. 2.

Monitoring module 302 may be configured to perform operations such as, for example: using a battery gas gauge to monitor battery charge cycles 351, determining the state of charge (SoC) and/or battery cell state of health (SoH) 353, and/or other monitored parameters such as: impedance, whether the battery cell SoC is present, the battery cell capacity/full battery cell charge capacity, and full battery cell charge capacity/design.

Storage 263 of BMU 266 may be present to store recorded environmental, system operating and/or event information which in an embodiment may be provided by data reduction and/or event identification tasks 304 performed by programmable integrated circuit 269. Data reduction tasks may include, for example: processing and/or transforming data received or derived in real time from sensors (e.g., such as one or more of the sensors illustrated and described in relation to FIGS. 2 and 3) into a data form for further processing, recording in storage 263 of BMU 266 (e.g., as part of a BMU exception log), and/or exporting from BMU 266 to other components of system 200, such as embedded controller (EC) 283, host programmable integrated circuit 205, etc.

Data reduction tasks may include performing one or more operations on monitored sensor data including, but not limited to, upscaling, editing, sorting, coding, collating, tabulating, summarizing, smoothing, interpolation, etc. Event identification tasks may include inspecting or reviewing reduced data that is recorded on Battery system storage 263 to determine if one or more predefined event types have occurred by comparing environmental, system operating and/or event information to predefined exception event criteria, that may be stored in storage 263. Any identified exception events may be recorded in a BMU exception log on storage 263 by event reduction and event identification logic 304.

In some embodiments, the severity of each identified event may also be optionally categorized by event reduction and event identification logic 304 and recorded in a BMU exception log on storage 263. For example, a sensed battery temperature of greater than 75° C. for a defined extended duration of time (e.g., for greater or equal to five minutes) may be predefined as a high severity exception event, whereas a sensed battery temperature of greater than 75° C. for less than the defined extended duration of time may be predefined as a low severity exception event.

Additionally or alternatively, certain exception events may be pre-designated for diagnostic testing with a diagnostic flag (e.g., "1"), while other type of events are designated with a no-diagnostic flag (e.g., "0") to allow normal booting. It will be understood that it is alternatively possible that severity of a given exception event may be determined by another programmable integrated circuits of IHS 200, such as EC 283 and/or host programmable integrated circuit 205, based on information provided in a BMU log.

BMU 266 may be configured to provide information stored on battery system storage 263 to one or more other programmable integrated circuits (e.g., EC 283, host programmable integrated circuit 205, etc.) of IHS 200. Moreover, information may be provided to off-host remote entities 314 (e.g., such as computer servers executing corporate or manufacturer/fabricator/supplier support programs, system administrator, monitoring systems, etc.) across network 312 (e.g., Internet, corporate intranet, etc.).

In some embodiments, collected data and/or other information may be aggregated with other system information (e.g., CPU data, EC data, etc.) that is passed off-host to remote entities 314 for analysis. Such remote entities 314 may take one or more actions, for example, based on this information, and/or it may record the provided information for future analysis.

Figure 4:
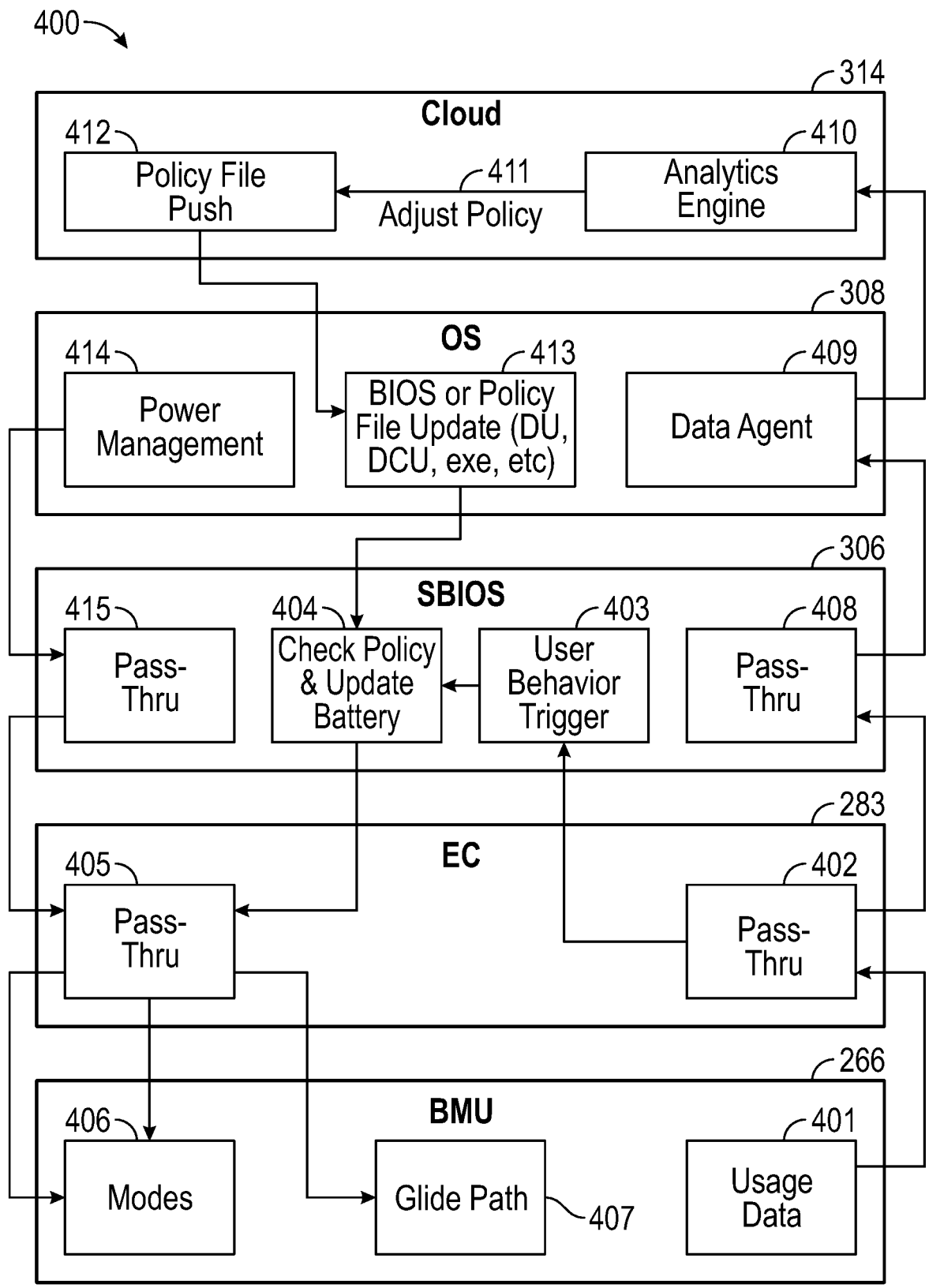
FIG. 4 illustrates an example of a remote battery management policy system with local feedback according to some embodiments.

FIG. 4 illustrates an example of a remote battery management policy system with local feedback according to some embodiments. As shown, BMU 266 is configured to capture usage data 401 and to send that data to System BIOS (SBIOS) 306. Usage behavior trigger 403 monitors whether usage data received from BMC 266 indicates that an actionable event has taken place, in which case the policy is checked and the battery is updated by module 404. Commands issued by module 404 may reach BMU 266 via pass-through module 405 of EC 283.

If a command requires a change in the battery's mode of operation, the command may be executed by battery mode selection module 406. If a command requires a change in a battery's glide path, the command may be executed by glide path module 407. In various embodiments, the path created between blocks 401-407 may provide an autonomous feedback loop configured to operate independently of the status of OS 308 and/or remote server(s) 314. That is, a battery management policy may be autonomously applied independently of any connection between IHS 200 and a remote server in cloud 314.

Additionally or alternatively, BMU 266 may send usage data 401 to analytics engine 410 of cloud 314 via pass-through module 402 of EC 283, pass-through module 408 of SBIOS 306, and data agent 409 of OS 308. Analytics engine 410 compares the usage data for the particular IHS with usage data for other IHSs and/or other user(s), and adjusts a battery management policy file based upon the comparison.

Module 412 pushes the battery management policy file down to BIOS or policy file update module 413, and/or power management module 414. The updated or adjusted battery management policy file is provided to module 404 and/or pass-through module 415 of SBIOS 306, and then to pass-through module 405 of EC 283, before battery configuration parameters are applied by battery mode selection module 406 and/or glide path module 407.

In some cases, battery mode selection module 406 may allow BMU 266 to switch between a standard charging mode, an express charging mode, a primarily AC charging mode, an adaptive charging mode, and a custom charging mode; each of these charging modes having different settings or specifications (e.g., voltages, currents, temperatures, times, etc.) applied to the battery.

In some implementations, for example, available settings may be restricted depending on the battery. Possible battery settings may include, but are not limited to:

(a) Standard: Fully charges the battery at a moderate rate. This setting provides a balanced approach to extending battery life while still providing a reasonably fast charging time. Recommended for users who frequently switch between battery and external power sources.

(b) Express: Quickly charges the battery using Dell fast-charge technology. Recommended for users who need the battery to charge quickly. If the system is powered on, then the battery typically charges to 80 percent within one hour and 100 percent in two hours. Charge time may be longer if the system is powered on (may cause battery health to diminish more quickly than other settings).

(c) Primarily AC: Extends battery life by lowering the charge threshold, so that the battery never charges to 100 percent capacity. Recommended for users who primarily operate the system while plugged into an external power source.

(d) Adaptive: Automatically optimizes battery settings based on the user's typical patterns. Recommended for users who want to "set it and forget it."

(e) Custom: User selects when the battery starts and stops charging. Recommended for advanced users.

To illustrate the operation of these settings, consider an example where a user discharges a battery to a low state of charge, and plugs the IHS in when it issues a low-battery alarm. Then, the user unplugs the IHS from the AC mains before battery is fully charged: these are behaviors of opportunity charging, and someone who needs a fast charge.

Consider yet another example of a user who spends most of its time with his or her IHS directly plugged into an AC source. When the user employs the battery, they do shallow discharges and plug back the IHS with battery still charge to 30% or more, or perhaps they simply almost never let the battery discharge below 30%. Then, the user charges back the battery to full: these area behaviors of desktop replacement or shallow discharge user, and they benefit from battery lifespan control methods. In this case, the techniques described herein may be employed, for example, to lower the top of charge, charge at normal speed, delay or prevent top ups, etc.

Figure 5:
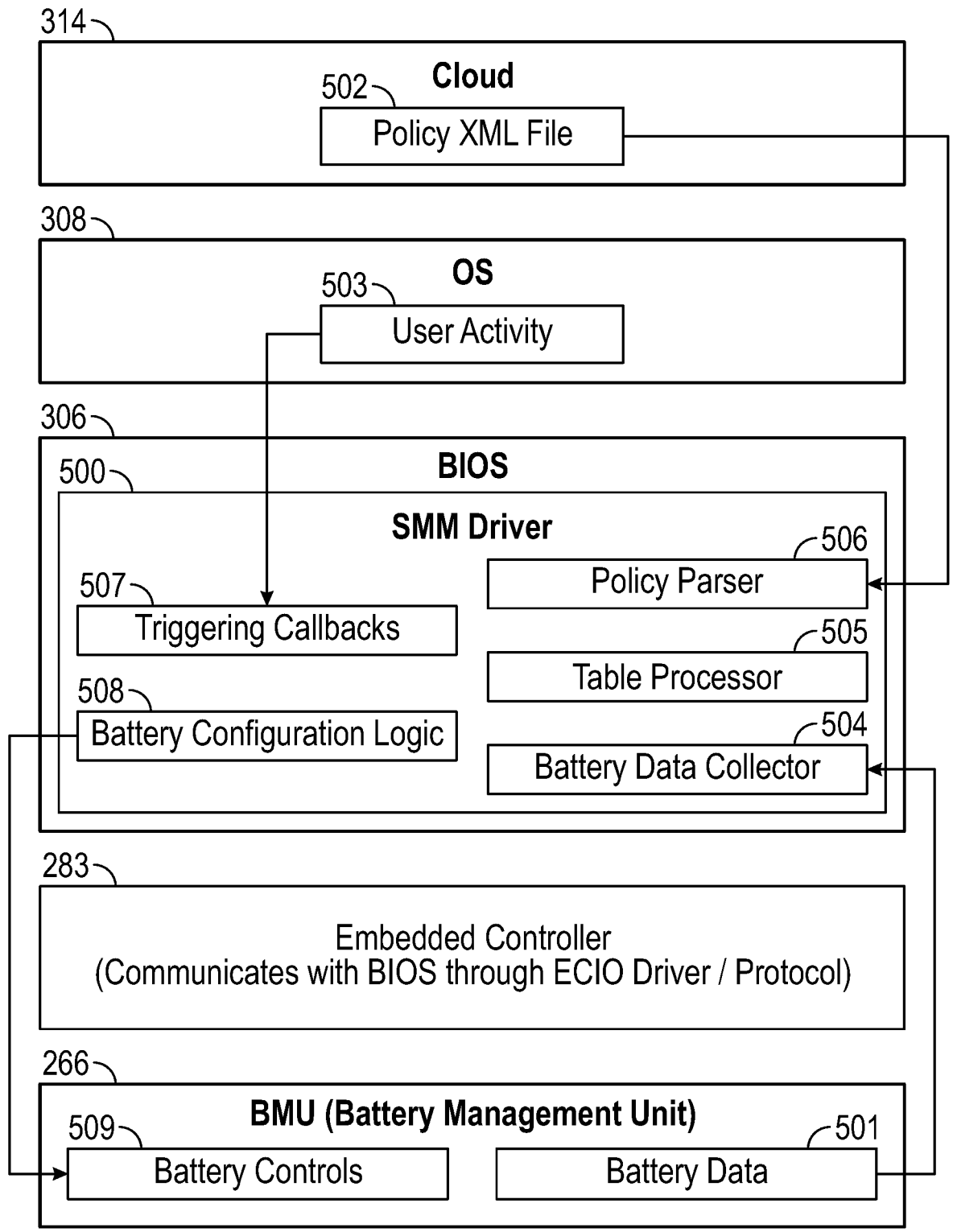
FIG. 5 illustrates an example of a system management mode (SMM) driver according to some embodiments.

FIG. 5 illustrates an example of system management mode (SMM) driver module 500 (of BIOS 306) according to some embodiments. As shown, battery data 501, policy XML file 502, and/or user activity 503, may be provided to SMM driver 500. Battery data 501 is received by battery data collector 504 and stored in a corresponding table by table processor 505. The battery management policy file is received as XML file 502, and parsed by policy parser 506. User activity 503 is detected by OS 308 and sent to triggering callback module 507. Battery configuration module 508 sends commands to battery controls 509.

Figure 6:
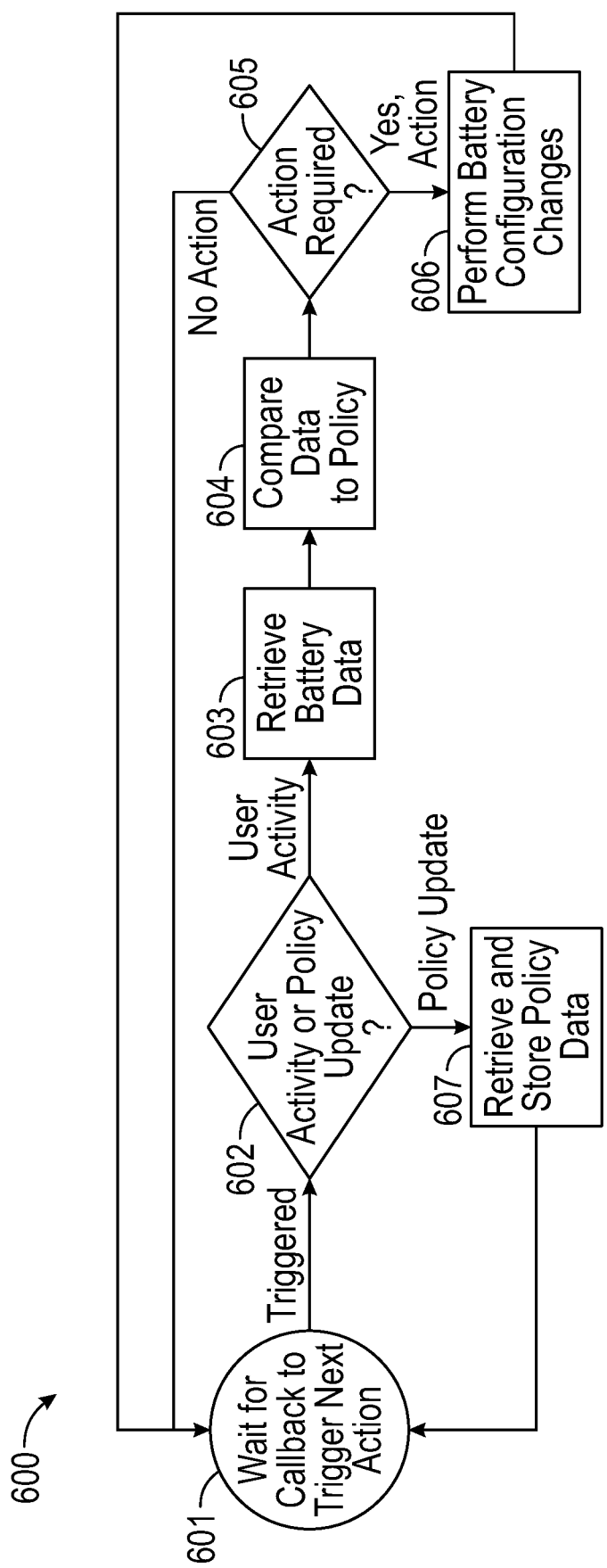
FIG. 6 illustrates an example of a method for applying remote battery management policies with local feedback according to some embodiments.

FIG. 6 illustrates an example of method 600 for applying remote battery management policies with local feedback. In some embodiments, method 600 may be performed, at least in part, by one or more components of SMM driver 500. At block 601, method 600 waits for a callback to trigger a corresponding action.

At block 602, after a trigger event is detected (e.g., an interrupt, etc.), method 600 determines whether the trigger was set due to user activity or a policy update. If there is a policy update, block 607 retrieves and stores updated policy data. If there is user activity, block 603 retrieves battery data and block 604 compares the retrieved battery data to the battery management policy. If block 605 determines that no action is required, control returns to block 601. Otherwise, block 606 performs configuration changes required by the policy.

In other implementations, however, rather than retrieving battery data, comparing to policy or instructions residing in the system, then taking action, an additional and/or alternative approach may be employed where were new policy values or threshold values may be updated into the battery, and the battery thereafter regulates itself in response to these new thresholds being crossed (without having to wait for an instruction from the system).

Figure 7:
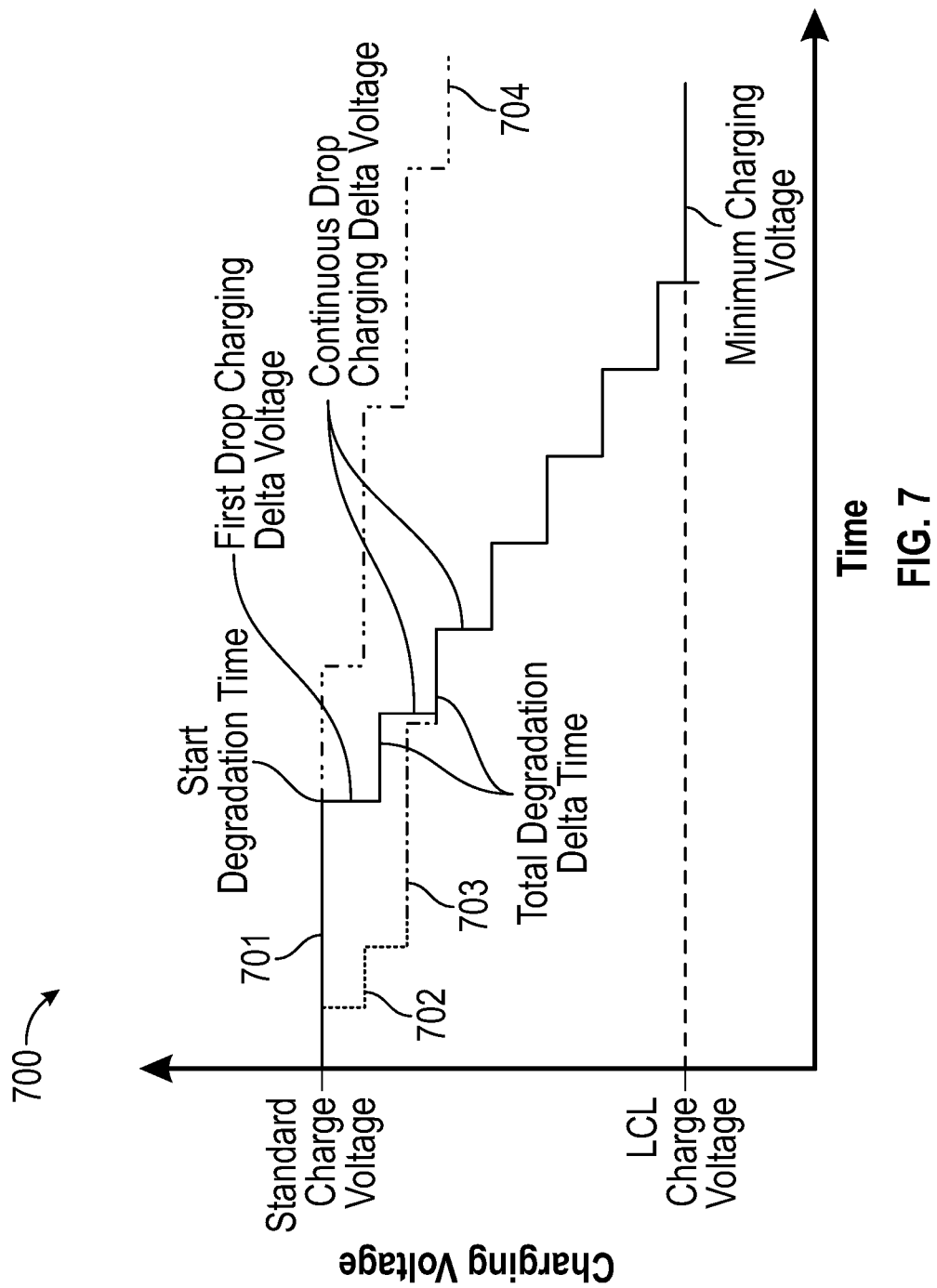
FIG. 7 illustrates an example of a method for controlling a battery's charging voltage guide path according to some embodiments.

FIG. 7 illustrates an example of a method for controlling a battery's charging voltage guide path. In some cases, these techniques may protect a battery from premature wear by mitigating early user behavior. For example, in some embodiments, if the user charges or discharges the battery too aggressively (e.g., more than n times a day, or a threshold number of incomplete charges per day, etc.), these techniques may purposefully restrict battery performance in order to increase the useful life of the battery, in a manner that is transparent to the local user (e.g., without prompt or notification).

In graph 700, curve 701 shows a charge voltage step-down pattern provided in a battery management policy file. When the user initially shows aggressive battery behavior, and an action is triggered in state 601, the step-down pattern of curve 701 can be adjusted to a more conservative curve 702 when action 605 is taken. At a trigger point later in time, the policy will be re-assessed, and if the user's behavior returns to normal or expected (e.g., compared to Policy in state 604), then action 605 is taken again, and recovery curve 703 returns the charge voltage step-down pattern to curve 701. As such, the charge voltage step-down pattern may be customized to the individual using the IHS, as the individual's behavior changes over time.

In some cases, a battery management policy update may be originated in cloud 314, either as an individual XML file or as part of a BIOS firmware update. In cases where policy updates have occurred, at a trigger point 602, the BIOS will perform a policy update, 607, and return to 601 to wait for the next trigger. In some cases, the policy update may allow a higher voltage 704 (more useful capacity) if analytics engine 410 determines that the original curve 701 was unnecessarily conservative.

When user behavior trigger module 403 detects that a local user's behavior has changed, it may notify analytics engine 410 in cloud 314 to receive an updated battery management policy file, which may be selected based upon the changed behavior. For example, a first battery management policy file may be applicable to IHSs being operated by a heavy business user with aggressive charging/discharging behavior, and therefore it may establish a conservative (low) maximum charging voltage or current. If the IHS is then transferred to a different, lighter user with less aggressive charging/discharging behavior, a different battery management policy file may be applied to that same IHS, and the updated policy may allow a higher maximum charging voltage or current value.

In other cases, a battery management policy file may be selected based upon the behavior or other users of other IHSs, with the same or different battery specifications. For example, analytics engine 410 may determine that another user's behavior has changed, and module 404 may apply the updated battery management policy to the IHS, wherein the battery management policy is selected based upon the changed behavior of the other user.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution, cause the IHS to:
   receive a battery management policy from a remote server; and
   apply the battery management policy to the IHS, wherein the battery management policy is selected based upon a local user's behavior, wherein the battery management policy establishes a maximum charging voltage or current for a battery coupled to the IHS, and wherein the maximum charging voltage or current is selected based upon a behavior of another user of another IHS having another battery.

2. The IHS of claim 1, wherein the battery management policy is selected based upon telemetry obtained by the IHS during operation of the IHS by the local user.

3. The IHS of claim 1, wherein the battery management policy establishes a mode of operation for a battery coupled to the IHS, the mode of operation selected from the group consisting of: standard, express, and AC-present.

4. The IHS of claim 3, wherein the program instructions, upon execution, further cause the IHS to:
   determine that the local user's behavior has changed;
   receive an updated battery management policy from the remote server; and
   apply the updated battery management policy to the IHS, wherein the battery management policy is selected based upon the changed behavior.

5. The IHS of claim 1, wherein the battery and the other battery have different electrical specifications.

6. The IHS of claim 1, wherein the program instructions, upon execution, further cause the IHS to:
   determine that the other user's behavior has changed;
   receive an updated battery management policy from the remote server; and
   apply the updated battery management policy to the IHS, wherein the battery management policy is selected based upon the changed behavior of the other user.

7. The IHS of claim 6, wherein the maximum charging voltage or current has a first value in response to the local user showing a more aggressive behavior than the other user, wherein the maximum charging voltage or current has a second value in response to the local user showing a less aggressive behavior than the other user, and wherein the first value is smaller than the second value.

8. The IHS of claim 1, wherein the battery management policy is autonomously applied by the IHS independently of any connection between the IHS and the remote server.

9. A hardware memory device having program instructions stored thereon that, upon execution by an Information Handling System (IHS), cause the IHS to:
   receive a battery management policy from a remote server; and
   apply the battery management policy to the IHS, wherein the battery management policy is selected based upon a local user's behavior, wherein the battery management policy establishes a maximum charging voltage or current for a battery coupled to the IHS, and wherein the maximum charging voltage or current is selected based upon a behavior of another user of another IHS having another battery.

10. The hardware memory device of claim 9, wherein the battery management policy is selected based upon telemetry obtained by the IHS during operation of the IHS by the local user.

11. The hardware memory device of claim 9, wherein the battery management policy establishes a mode of operation for a battery coupled to the IHS, the mode of operation selected from the group consisting of: standard, express, primarily AC, adaptive, and custom.

12. The hardware memory device of claim 9, wherein the program instructions, upon execution, further cause the IHS to:
    determine that the local user's behavior has changed;
    receive an updated battery management policy from the remote server; and
    apply the updated battery management policy to the IHS, wherein the battery management policy is selected based upon the changed behavior.

13. The hardware memory device of claim 9, wherein the battery management policy establishes a maximum charging voltage or current for a battery coupled to the IHS.

14. The hardware memory device of claim 9, wherein the maximum charging voltage or current has a first value in response to the local user showing a more aggressive charging/discharging behavior than the other user, wherein the maximum charging voltage or current has a second value in response to the local user showing a less aggressive charging/discharging behavior than the other user, and wherein the first value is smaller than the second value.

15. A method, comprising:
    receiving a battery management policy from a remote server; and
    applying the battery management policy to the IHS, wherein the battery management policy is selected based upon a local user's behavior, wherein the battery management policy establishes a maximum charging voltage or current for a battery coupled to the IHS, and wherein the maximum charging voltage or current is selected based upon a behavior of another user of another IHS having another battery.

16. The method of claim 15, further comprising:
    determining that the local user's behavior has changed;
    receiving an updated battery management policy from the remote server; and applying the updated battery management policy to the IHS, wherein the battery management policy is selected based upon the changed behavior.

\* \* \* \* \*